(12) United States Patent
Noda

(10) Patent No.: US 6,872,802 B2
(45) Date of Patent: Mar. 29, 2005

(54) PLASTIC ARTICLES DIGESTIBLE BY HOT ALKALINE TREATMENT

(75) Inventor: Isao Noda, Fairfield, OH (US)

(73) Assignee: The Procter & Gamble Company, Cincinatti, OH (US)

( * ) Notice: Subject to any disclaimer, the term of this patent is extended or adjusted under 35 U.S.C. 154(b) by 0 days.

(21) Appl. No.: 10/430,793

(22) Filed: May 6, 2003

(65) Prior Publication Data

US 2003/0208034 A1 Nov. 6, 2003

Related U.S. Application Data

(63) Continuation of application No. PCT/US01/43853, filed on Nov. 6, 2001.
(60) Provisional application No. 60/246,158, filed on Nov. 6, 2000.

(51) Int. Cl.[7] ................................................. C08F 6/00
(52) U.S. Cl. ........................ 528/480; 428/533; 524/423
(58) Field of Search ........................ 428/533; 524/423; 528/480

(56) References Cited

U.S. PATENT DOCUMENTS

| | | |
|---|---|---|
| 5,472,518 A | 12/1995 | Patnode et al. |
| 6,162,852 A * | 12/2000 | Honeycutt et al. .......... 524/423 |

FOREIGN PATENT DOCUMENTS

| | | |
|---|---|---|
| EP | 0 573 042 A | 12/1993 |
| EP | 0 679 412 A1 | 11/1995 |
| WO | WO 95/20621 | 8/1995 |

OTHER PUBLICATIONS

Annual Review of Microbiology; Microbial Degradation of Polyhydroxyalkanoates; Dieter Jendrossek and René Handrick; Oct. 2002, vol. 56, pp. 403–432.*

Shimamura et al., Physical Properties and Biodegradabilityof Microbial Poly(3–hydroxybutyrate–co–3–hydroxyhexanoate), Macromolecules, 1994, vol. 27, pp. 878–880.

JP 08 253619 A, abstract, Patent Abstracts of Japan, 08253619, Jan. 19, 1996.

* cited by examiner

*Primary Examiner*—Terressa Boykin
(74) *Attorney, Agent, or Firm*—Armina E. Matthews; Laura R. Grunzinger; Brahm J. Corstanje

(57) ABSTRACT

A method of disposing of a biodegradable plastic comprises the step of exposing the biodegradable plastic to a hot alkaline solution. The biodegradable plastic is a polyhydroxyalkanoate copolymer comprising two randomly repeating monomer units wherein the first randomly repeating monomer unit has the structure:

$$\left[ O - \underset{\underset{R^1}{|}}{CH} - (CH_2)_n - \underset{\underset{O}{\|}}{C} \right] \quad (i)$$

wherein $R^1$ is H or a $C_{1-2}$ alkyl, and n is 1 or 2; and the second randomly repeating monomer unit has the structure:

$$\left[ O - \underset{\underset{R^2}{|}}{CH} - CH_2 - \underset{\underset{O}{\|}}{C} \right] \quad (ii)$$

wherein $R^2$ is a $C_{3-19}$ alkyl or a $C_{3-19}$ alkenyl. At least 50% of the randomly repeating monomer units have the structure of the first randomly repeating monomer unit.

32 Claims, No Drawings

PLASTIC ARTICLES DIGESTIBLE BY HOT ALKALINE TREATMENT

CROSS-REFERENCE

Continuation of prior application No. PCT/US01/43853, filed Nov. 6, 2001 claiming priority to U.S. provisional application No. 60/246,158, filed Nov. 6, 2000.

TECHNICAL FIELD

This invention relates to methods of disposing of materials such as plastics. More particularly, this invention relates to methods of disposing plastics comprising polyhydroxyalkanoate copolymer by contacting the plastics with a hot alkaline solution. The invention further relates to articles which comprise polyhydroxyalkanoate copolymer and which may be at least partly digested by exposure to a hot alkaline solution.

BACKGROUND ART

Polymers find uses in a variety of plastic articles including films, sheets, fibers, foams, molded articles, adhesives and many other specialty products. The majority of these plastic materials ends up in the solid waste stream. While some efforts at recycling have been made, repeated processing of even pure polymers results in degradation of material and consequently poor mechanical properties. Different grades of chemically similar plastics mixed upon collection can cause processing problems that make the reclaimed material inferior or unusable. Thus, there is a need for plastic articles which are biodegradable.

Used solid articles may occupy a large volume, and may be inconvenient when used in an environment of limited waste disposal options, such as an ocean-going ship which would have to contain its solid refuse until reaching shore. Further, solid articles may become hazardous or controlled waste requiring special treatment, such as the autoclaving of hospital or other medical waste. Thus, there is a need for a method of converting solid articles to a liquid form, preferably a biodegradable liquid form. Preferably, the conversion could occur simultaneously with a decontamination step, such as during steam autoclaving of hospital and medical waste.

Honeycutt, U.S. Pat. Nos. 5,181,967, 5,207,837 and 5,268,222, and Honeycutt et al., U.S. Pat. No. 5,470,653, disclose articles made of polymers which are water soluble at high temperatures, such as propylcellulose, polyvinyl alcohol, and copolymers of polyvinyl acetate and polyvinyl alcohol.

Patnode et al., U.S. Pat. Nos. 5,472,518, 5,508,101, 5,567,510 and 5,630,972, disclose aqueous-alkaline disposable articles comprising a hydrolytically degradable polymer such as polymers and copolymers of poly(lactic acid), poly(ester amide), poly(glycolic acid), poly(vinyl alcohol), poly(hydroxybutyrate-co-valerate). Patnode et al. teach that the articles will disperse during a single commercial laundry cycle into waste water having a basic pH less than 12 and an elevated temperature.

Japanese Patent Application No. 08-253,619 discloses a method of disposing of molded plastic products containing biodegradable resin having an ester bond by contacting the molded product with a solution containing at least an alkali metal compound or an alkaline-earth metal compound, and an alcoholic compound. Among the ester bond-containing biodegradable resins which are disclosed are polyhydroxyvaleric acid, polyhydroxybutyric acid, hydroxyvaleric acid copolymers, polycaprolactone, polyhydroxylbutyric acid, polyethylene succinate, polyethylene glutarate, polyethylene adipate, polybutylene adipate, polybutylene succinate, and polybutyric acid.

Ajioka et al., U.S. Pat. No. 5,780,704, discloses a process for decomposing a thermoplastic polymer composition comprising a polyhydroxycarboxylic acid base polymer by contacting the polymer with an alkaline solution of a pH of 10 or more to produce hydroxycarboxylic acid. Ajioka et al. further disclose that suitable polyhydroxycarboxylic acid base polymers include polymers of lactic acid, glycolic acid, 3-hydroxybutyric acid, 4-hydroxybutyric acid, 4-hydroxyvaleric acid, 5-hydroxyvaleric acid, and 6-hydroxycaproic acid.

Satoh et al., *Polymer*, Vol. 35 (2), pp. 286–290 (1994), teach that the addition of poly(hydroxybutyrate-co-hydroxyvalerate) to a film of poly(hydroxybutyrate) could decrease the level of crystallinity in the blend, and the lower the initial crystallinity of the films, the higher the rate of hydrolytic degradation.

Holmes, U.S. Pat. No. 4,620,999, and EP 0 142 950 A, teaches disposable bags for body-waste comprising a 3-hydroxybutyrate polymer and a basic material to modify the pH of the bag contents to a pH of at least about 12. Holmes teaches that modifying the pH of the contents increases the rate of the polymer's degradation.

Noda, U.S. Pat. No. 5,918,747, discloses a process for recovering polyhydroxyalkanoates from biological sources. Noda further teaches the polyhydroxyalkanoates can be used to form disposable health care products such as bandages, wound dressings, wound cleansing pads, surgical gowns, surgical covers, surgical pads and bedding items such as sheets, pillowcases and foam mattress pads.

Unfortunately, many prior art plastic items comprise plasticizers, are lacking in strength or have poor water permeation resistance and/or grease permeation resistance. Further, many biodegradable items are brittle, are incapable of degrading under both aerobic and anaerobic conditions, or can not be easily digested to a non-viscous biodegradable liquid.

Additionally, prior art polymers such as polyhydroxybutyrate and polyhydroxy-butyrate-co-hydroxyvalerate often have unsatisfactory properties. Polyhydroxybutyrate tends to be thermally unstable, while polyhydroxybutyrate and polyhydroxybutyrate-co-hydroxyvalerate often have slow crystallization rates and flow properties which make processing difficult. For example, polyhydroxybutyrate-co-hydroxyvalerate remains tacky for long periods of time, and may stick to itself when being processed into films.

Other polymers, like polylacticacid and polyhydroxyoctanoate, become excessively soft at even moderate temperatures below 80° C. This limits their utility in many applications.

Many polymers which may be dissolved in hot water, such as poly(vinyl alcohol) polymers, will form highly viscous and sticky solutions which are difficult to handle and dispose. Other polymers, such as polycaprolactone or succinic acid copolymers, digest slowly or to a limited degree when treated with alkaline solutions. Other polymers undergo alkaline digestion at a convenient rate only at extremely high temperatures, such as greater than about 170° C. Such high temperatures may not be reached by some simple steam systems, such as steam autoclaves. Thus, there is a need for a polymer which can form ductile and flexible articles, and which can be quickly and conveniently digested to form a non-viscous liquid wherein the liquid itself is biodegradable.

SUMMARY OF INVENTION

Accordingly, it is an object of this invention to obviate various problems of the prior art.

It is another object of this invention to provide articles which may be at least partially digested, preferably substantially digested, with hot alkaline solutions.

It is another object of this invention to provide for methods of reducing the volume of solid refuse articles.

It is another object of this invention to provide methods of reducing the volume of medical waste and simultaneously decontaminating the waste of pathogenic organisms.

In accordance with one aspect of the invention there are provided methods of disposing of biodegradable material, the methods comprising the step of exposing the biodegradable material to hot alkaline solution. The biodegradable plastic comprising polyhydroxyalkanoate copolymer comprising two randomly repeating monomer units wherein the first randomly repeating monomer unit has the structure:

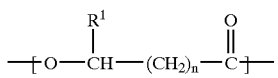

(i)

wherein $R^1$ is H or a $C_{1-2}$ alkyl, and n is 1 or 2; and the second randomly repeating monomer unit has the structure:

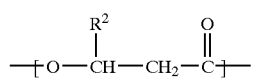

(ii)

wherein $R^2$ is a $C_{3-19}$ alkyl or a $C_{3-19}$ alkenyl; and wherein at least 50% of the randomly repeating monomer units have the structure of the first randomly repeating monomer unit.

In accordance with another aspect of the invention there are provided methods of of converting at least a portion of a solid article to a biodegradable liquid, comprising the steps of:

(a) providing a solid article comprising polyhydroxyalkanoate copolymer comprising a first randomly repeating monomer unit having the structure:

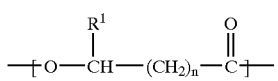

(i)

wherein $R^1$ is H or a $C_{1-2}$ alkyl, and n is 1 or 2; and a second randomly repeating monomer unit having the structure:

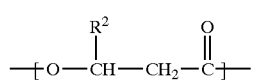

(ii)

wherein $R^2$ is a $C_{3-19}$ alkyl or a $C_{3-19}$ alkenyl; and wherein at least 50% of the randomly repeating monomer units have the structure of the first randomly repeating monomer unit; and (b) contacting the solid article with hot alkaline solution.

In accordance with yet another aspect of the invention there are provided articles which are capable of being at least partially digested by exposure to hot alkaline solution. The articles comprise polyhydroxyalkanoate copolymer comprising a first randomly repeating monomer unit having the structure:

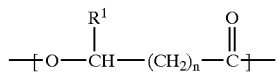

(i)

wherein $R^1$ is H or a $C_{1-2}$ alkyl, and n is 1 or 2; and a second randomly repeating monomer unit having the structure:

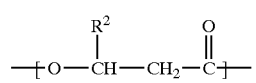

(ii)

wherein $R^2$ is a $C_{3-19}$ alkyl or a $C_{3-19}$ alkenyl; wherein at least 50% of the randomly repeating monomer units have the structure of the first randomly repeating monomer unit.

In accordance with another aspect of the invention there are provided methods of decontaminating and at least partially digesting a health care item, the method comprising the steps of providing a health care item, and contacting the health care item with hot alkaline solution. The health care item is formed of a material comprising polyhydroxyalkanoate copolymer comprising a the first randomly repeating monomer unit having the structure:

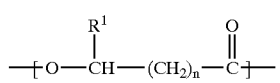

(i)

wherein $R^1$ is H or a $C_{1-2}$ alkyl, and n is 1 or 2; and a second randomly repeating monomer unit having the structure:

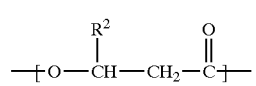

(ii)

wherein $R^2$ is a $C_{3-19}$ alkyl or a $C_{3-19}$ alkenyl; and wherein at least 50% of the randomly repeating monomer units have the structure of the first randomly repeating monomer unit.

DETAILED DESCRIPTION

Applicants have found that polyhydroxyalkanoate copolymers in accordance with the invention (PHAs) may be readily digested with hot alkaline solution, preferably an aqueous hot alkaline solution. While not being bound by theory, it is believed the hot alkaline treatment hydrolyzes the polymer to a mixture of monomers and possibly low molecular weight oligomers and/or small particulates. The resulting liquid, which may be in the form of a solution, a slurry or a suspension, is biodegradable, and thus disposable in a sewer system. Advantageously, the liquid tends to have low viscosity, and any particulates tend to stay suspended rather than to precipitate. Thus, the resulting liquid is easily handled and disposed.

The PHAs employed in the present invention will biodegrade under both aerobic and anaerobic conditions, thus, items formed from the PHAs can biodegrade even when under water and the liquids formed by hot alkaline treatment of PHAs can biodegrade even when diluted with water. Biodegradable items in accordance with the invention are unexpectedly resistant to liquids and grease. The items are formed from PHAs having softening temperatures greater than their use temperatures. The items are formed from PHAs which exhibit surprisingly good self-sealability and adhesion to paper substrates.

Further, unlike the homopolymer poly(3-hydroxybutyrate) (PHB) or the copolymer polyhydroxybutyrate-co-hydroxyvalerate (PHBV), PHAs employed in the invention are tough without being brittle. Thus items comprising the PHAs are less likely to crack or chip. Applicants have found that the polyhydroxyalkanoates employed in the present invention have lower melt temperatures, lower degrees of crystallinity and improved melt rheologies relative to polyhydroxybutyrate and polyhydroxybutyrate-co-hydroxyvalerate. As the PHAs of the present invention have low melting temperatures, the PHAs are easily processed into films and coatings. Flexible articles may be prepared using the PHAs. The PHAs employed in the present invention have melting temperatures much lower than their decomposition temperatures.

As used herein, "alkyl" refers to a saturated carbon-containing chain which may be straight or branched, and substituted (mono- or poly-) or unsubstituted, while, "alkenyl" refers to a carbon-containing chain which may be mono-unsaturated (i.e., one double bond in the chain) or poly-unsaturated (i.e., two or more double bonds in the chain), straight or branched, and substituted (mono- or poly-) or unsubstituted.

As used herein, "PHA" refers to a polyhydroxyalkanoate of the present invention, "RRMU" refers to a randomly repeating monomer unit and "RRMUs" refers to randomly repeating monomer units.

As used herein, "biodegradable" refers to the ability of a compound to ultimately be degraded completely into $CO_2$, $CH_4$, and water or biomass by microorganisms and/or natural environmental factors.

All copolymer composition ratios recited herein refer to molar ratios, unless specifically indicated otherwise. All percentages and parts are by weight, unless specifically indicated otherwise.

The polyhydroxyalkanoates used in the present invention made be synthetically prepared, or may be produced by a variety of biological organisms, such as bacteria or algae.

The polyhydroxyalkanoates may be atactic, isotactic or syndiotactic. The polyhydroxyalkanoates used herein are preferably substantially isotactic (from about 90% to about 100%, by weight, isotactic) or fully isotactic (about 100%, by weight, isotactic). Fully isotactic polyhydroxyalkanoates may be obtained from biological organisms.

The polyhydroxyalkanoates are copolymers comprising at least about 2 different monomers. In some embodiment, the polyhydroxyalkanoates are copolymers comprising at least about 3 different monomers.

In one embodiment, the polyhydroxyalkanoate comprises at least two randomly repeating monomer units (RRMUs).

The first randomly repeating monomer unit has the structure:

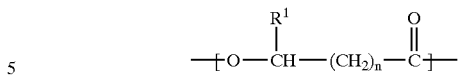

wherein $R^1$ is H or a $C_{1-2}$ alkyl, and n is 1 or 2. In a particular embodiment, the first randomly repeating monomer unit is selected from the group consisting of the monomer wherein $R^1$ is a $C_1$ alkyl and n is 1 (the monomeric repeat unit 3-hydroxybutyrate); the monomer wherein $R^1$ is a $C_2$ alkyl and n is 1 (the monomeric repeat unit 3-hydroxyvalerate); the monomer wherein $R^1$ is H and n is 2 (the monomeric repeat unit 4-hydroxybutyrate); the monomer wherein $R^1$ is H and n is 1 (the monomeric repeat unit 3-hydroxypropionate); and mixtures thereof.

The second randomly repeating monomer unit has the structure:

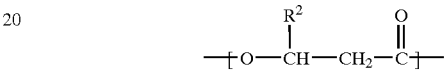

wherein $R^2$ is a $C_{3-19}$ alkyl or a $C_{3-19}$ alkenyl. Suitable second RRMUs include those wherein $R^2$ is a $C_{3-7}$ alkyl or alkenyl, a $C_5$ alkyl or alkenyl, a $C_7$ alkyl or alkenyl, a $C_{8-11}$ alkyl or alkenyl, a $C_8$ alkyl or alkenyl, a $C_9$ alkyl or alkenyl, a $C_{12-19}$ alkyl or alkenyl, a $C_{3-11}$ alkyl or alkenyl, or a $C_{4-19}$ alkyl or alkenyl.

In one embodiment of the present invention, at least about 50% of the RRMUs have the structure of the first RRMU. In another embodiment at least about 60% of the RRMUs have the structure of the first RRMU. In a further embodiment at least about 70% of the RRMUs have the structure of the first RRMU. In additional embodiments of the present invention, at least about 80% or at least about 85% of the RRMUs have the structure of the first RRMU.

The polyhydroxyalkanoates employed in the present invention may be processed into molded articles (e.g., injected or blow molded). In one embodiment of the invention when the PHAs are processed into molded articles from about 80% to about 99.5% of the RRMUs of the PHAs have the structure of the first RRMU. In other embodiments when the polyhydroxyalkanoates of the present invention are processed into molded articles from about 90% to about 99.5% or from about 92% to about 97% of the RRMUs of the PHAs have the structure of the first RRMU.

In one embodiment of the invention when the polyhydroxyalkanoates employed in the present invention are processed into thermoformed articles from about 70% to about 98% of the RRMUs of the PHAs have the structure of the first RRMU. In other embodiments of the invention when the polyhydroxyalkanoates employed in the present invention are processed into thermoformed articles from about 75% to about 97% or from about 80% to about 96% of the RRMUs of the PHAs have the structure of the first RRMU.

The polyhydroxyalkanoates employed the present invention may be processed into foams. In one embodiment, when the PHAs employed in the present invention are processed into foams from about 70% to about 97% of the RRMUs of the PHAs have the structure of the first RRMU. In other embodiments when the PHAs employed in the present invention are processed into foams from about 80% to about 96% or from about 86% to about 95% of the RRMUs of the PHAs have the structure of the first RRMU.

In one embodiment, when the polyhydroxyalkanoates employed in the present invention are processed into films, sheets, or soft elastic fibers, from about 50% to about 99.9% of the RRMUs of the PHAs have the structure of the first RRMU. In other embodiments, when the polyhydroxyalkanoates employed in the present invention are processed into films, sheets, or soft elastic fibers, from about 80% to about 99.5% or from about 90% to about 99%, of the RRMUs of the PHAs have the structure of the first RRMU.

The polyhydroxyalkanoates employed in the present invention may be processed into normal fibers. In one embodiment when the polyhydroxyalkanoates employed in the present invention are processed into normal fibers from about 80% to about 99.5% of the RRMUs of the PHAs have the structure of the first RRMU. In other embodiments when the polyhydroxyalkanoates employed in the present invention are processed into normal fibers from about 90% to about 99.5% or from about 95% to about 99.5%, of the RRMUs of the PHAs have the structure of the first RRMU.

In another embodiment, when the polyhydroxyalkanoates employed in the present invention are processed into elastomers or adhesives, such as bandage adhesives about 50% of the RRMUs of the PHAs have the structure of the first RRMU.

In a further embodiment, when the polyhydroxyalkanoates of the present invention are processed into nonwoven fabrics from about 85% to about 99.5% of the RRMUs of the PHAs have the structure of the first RRMU. In other embodiments, when the polyhydroxyalkanoates of the present invention are processed into nonwoven fabrics from about 90% to about 99.5% or from about 95% to about 99.5% of the RRMUs of the PHAs have the structure of the first RRMU.

In one embodiment, the first randomly repeating monomer unit is selected from the group consisting 3-hydroxybutyrate, 3-hydroxyvalerate, 4-hydroxybutyrate, 3-hydroxypropionate and mixtures thereof, and at least about 50% of the RRMUs have the structure of the first RRMU.

In another embodiment, the polyhydroxyalkanoate employed in the present invention comprises one or more additional RRMUs having the structure:

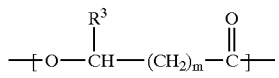

wherein $R^3$ is H, a $C_{1-19}$ alkyl or a $C_{1-19}$ alkenyl, and m is 1 or 2; and wherein the additional RRMUs are not the same as the first RRMU or the second RRMU. In one embodiment the copolymer comprises from at least about 3 different RRMUs, while in a further embodiment the copolymer comprises from about 3 to about 20 different RRMUs.

In one embodiment, $R^3$ is a $C_{1-19}$ alkyl or a $C_{1-19}$ alkenyl, and m is 1, while in another embodiment $R^3$ is a H, a $C_{1-2}$ alkyl or a $C_{1-2}$ alkenyl, and m is 1 or 2. In a preferred embodiment, the third RRMU is selected from the group consisting of the monomer wherein $R^3$ is a $C_1$ alkyl and m is 1 (the monomeric repeat unit 3-hydroxybutyrate); the monomer wherein $R^3$ is a $C_2$ alkyl and m is 1 (the monomeric repeat unit 3-hydroxyvalerate); the monomer wherein $R^3$ is H and m is 2, (the monomeric repeat unit 4-hydroxybutyrate); the monomer wherein $R^3$ is H and m is 1, (the monomeric repeat unit 3-hydroxypropionate) and mixtures thereof.

In another embodiment, a polyhydroxyalkanoate employed in the present invention comprises two RRMUs wherein the first RRMU has the structure:

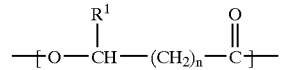

wherein $R^1$ is H or a $C_2$ alkyl, and n is 1 or 2; and the second RRMU has the structure:

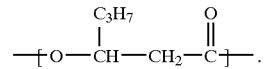

Preferably at least about 50% of the RRMUs have the structure of the first RRMU.

In one embodiment, a polyhydroxyalkanoate employed in the present invention comprises three RRMUs, a first RRMU having the structure:

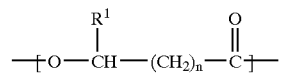

wherein $R^1$ is H or a $C_{1-2}$ alkyl, and n is 1 or 2; a second RRMU having the structure:

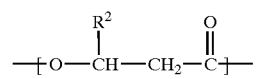

wherein $R^2$ is a $C_{3-19}$ alkyl or a $C_{3-19}$ alkenyl, preferably a $C_{4-19}$ alkyl or a $C_{4-19}$ alkenyl; and a third RRMU having the structure:

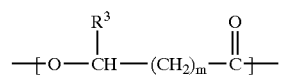

wherein $R^3$ is H, a $C_{1-19}$ alkyl or a $C_{1-19}$ alkenyl, and m is 1 or 2; and wherein the third RRMU is not the same as the first RRMU or the second RRMU. Preferably at least 50% of the RRMUs have the structure of the first RRMU.

In another embodiment, the polyhydroxyalkanoate copolymer comprises a first randomly repeating monomer unit having the structure:

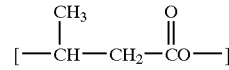

and a second randomly repeating monomer unit having the structure:

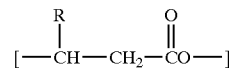

wherein R is $(CH_2)_q$—$CH_3$ and q is a least 2, preferably from about 2 to about 18, more preferably from about 4 to about 16, and even more preferably about 4. The molar ratio of the first RRMU to the second RRMU is from about 50:50 to about 99:1, preferably from about 80:20 to about 96:4, more preferably from about 88:12 to about 93:7.

Suitably, the molecular weight of the polyhydroxyalkanoates is dependent on the desired characteristics of the polymer. In one embodiment, greater than about 25,000. In another embodiment the weight average molecular weight is no greater than about 400,000. In yet another embodiment the weight average molecular weight is greater than about 400,000, preferably greater than 500,000.

The volume percent crystallinity ($M_c$) of a semi-crystalline polymer (or copolymer) often determines what type of end-use properties the polymer possesses. For example, highly (greater than 50%) crystalline polyethylene polymers are strong and stiff, and suitable for products such as plastic cups. Low crystalline polyethylene, on the other hand, is flexible and tough, and is suitable for products such as bags. Crystallinity can be determined in a number of ways, including x-ray diffraction, differential scanning calorimetry (DSC), density measurements, and infrared absorption, as discussed by Noda, U.S. Pat. No. 5,618,855, incorporated herein by reference.

Suitably, the PHAs of the present invention preferably have a volume percent crystallinity dependent on the desired characteristics of the polymer. In general, PHAs of the present invention have a volume percent crystallinity of from about 0.1% to about 99% as measured via x-ray diffraction. In one embodiment the volume percent crystallinity is from about 2% to about 80%; while in a further embodiment the volume percent crystallinity is from about 20% to about 70%. In another embodiment the volume percent crystallinity of PHAs employed in the present invention is no greater than 50%.

In one embodiment, when a PHA employed in the present invention is to be processed into a film, the amount of crystallinity in such PHA is from about 2% to about 65% as measured via x-ray diffraction. In other embodiments, the amount of crystallinity in such PHA is from about 5% to about 50%, or from about 20% to about 40%.

In another embodiment, when a PHA employed in the present invention is to be processed into a sheet, the amount of crystallinity in such PHA is from about 0.1% to about 50% as measured via x-ray diffraction. In other embodiments, the amount of crystallinity in such PHA is from about 5% to about 50%, or from about 20% to about 40%.

In another embodiment, when a PHA employed in the present invention is to be processed into a normal fiber or a nonwoven fabric, the amount of crystallinity in such PHA is from about 60% to about 99% as measured via x-ray diffraction. In other embodiments, the amount of crystallinity in such PHA is from about 70% to about 99%, or from about 80% to about 99%.

In a further embodiment, when a PHA employed in the present invention is to be processed into a soft elastic fiber, the amount of crystallinity in such PHA is from about 30% to about 80% as measured via x-ray diffraction. In other embodiments, the amount of crystallinity in such PHA is from about 40% to about 80%, or from about 50% to about 80%.

In one embodiment, when a PHA employed in the present invention is to be processed into a molded or thermoformed article, the amount of crystallinity in such PHA is from about 10% to about 80% as measured via x-ray diffraction. In other embodiments, the amount of crystallinity in such PHA is from about 20% to about 70%, or from about 30% to about 60%.

In another embodiment, when a PHA employed in the present invention is to be processed into an elastomer or adhesive, the amount of crystallinity in such PHA is less than about 50% as measured via x-ray diffraction. In other embodiments, the amount of crystallinity in such PHA is less than about 30%, or less than about 20%.

In one embodiment, the biodegradable PHAs employed in the present invention have a melt temperature (Tm) of from about 30° C. to about 160° C. In another embodiment, the PHAs have a Tm of from about 60° C. to about 140° C., while in a further embodiment the PHAs have a Tm of from about 90° C. to about 120° C.

Suitable polyhydroxyalkanoates include those disclosed in Noda, U.S. Pat. Nos. 5,498,692; 5,502,116; 5,536,564; 5,602,227; 5,618,855; 5,685,756; and 5,747,584, incorporated herein by reference.

Although polyhydroxyalkanoate copolymer components of solid articles are biodegradable under both aerobic and anaerobic conditions, there are occasions where it would be convenient to reduce the volume of solid refuse. Further, there are occasions where it would be desirable to reduce the volume of solid refuse while at the same time destroying any pathogenic organisms, such as bacteria, viruses and fungal spores, which may be present in or on the solid refuse. Advantageously, it has been found that treatment with hot alkaline solution will at least partially, preferably totally, digest a polyhydroxyalkanoate article into a biodegradable liquid or slurry.

The alkaline solution may be formed using any suitable base, such as one or more hydroxides, oxides and/or carbonates of alkaline metals such as potassium and sodium, and hydroxides, oxides and/or carbonates of alkaline earth metals such as calcium, magnesium and barium. Preferred bases include sodium hydroxide and potassium hydroxide. In addition to the base, the alkaline solution comprises a liquid carrier, preferably water.

The alkaline solution may further comprise one or more additives such as surfactants, builders, dyes, perfumes, bleaching agents (such as a chlorine bleach or a source of hydrogen peroxide), bleach activators (such as TAED and/or bleach catalysts), suds suppressors, dispersant polymers, silvercare agents, anti-tarnish and/or anti-corrosion agents, fillers, germicides, hydrotropes, anti-oxidants, enzymes, enzyme stabilizing agents, solubilizing agents, processing aids, pigments, pH control agents, and mixtures thereof. The alkaline solution may be prepared with readily available cleaning compositions, such as automatic dishwashing compositions, provided that, when diluted, the resulting liquid has an alkaline pH. Suitable hot alkaline solutions include, but are not limited to, compositions of from about 0.01N to about 1N, preferably about 0.1 N sodium hydroxide, or comprising from about 0.1% to about 10%, preferably about 5%, of an aqueous solution of an automatic dishwashing composition (such as CASCADE®, The Procter & Gamble Company, Cincinnati, Ohio).

The pH of the hot alkaline solution is greater than about 7, preferably at least about 8.5. In one embodiment, the pH of the hot alkaline solution is at least about 10. In another embodiment, the pH is from about 8.5 to about 14, preferably from about 8.5 to about 12. When the alkaline solution comprises an automatic dishwashing composition, the pH is generally at least about 10, preferably in the range of from about 10 to about 12.

Articles comprising PHAs are contacted with the alkaline solution at a temperature sufficiently elevated such that digestion of the PHAs occur. Although digestion may occur at temperatures below 100° C., for rapid digestion it is preferred to raise the temperature of the hot alkaline solution above the boiling point of water. Thus, in one embodiment, the temperature of the alkaline solution is at least about 100° C., preferably at least about 120° C., more preferably greater than about 140° C., and even preferably greater than about 150° C.

A convenient method of digestion, which also serves to decontaminate pathogenic organisms, is autoclaving the polyhydroxyalkanoate-containing article with the hot alkaline solution in a steam autoclave, as commonly used in hospitals. Although there is no maximum temperature above which the digestion will not occur, many autoclaves have operating temperatures of no greater than about 170° C., often in the range of from about 120° C. to about 170° C. Thus, in one embodiment the hot alkaline solution has a temperature of at least about 120° C., preferably at least 140° C., more preferably at least 150° C., and generally no greater than about 170° C. In another embodiment, the hot alkaline solution has a temperature in the range of from about 120° C. to about 170° C., preferably from about 140° C. to about 170° C., and more preferably from about 150° C. to about 170° C., while in yet another embodiment the hot alkaline solution has a temperature in the range of from about 120° C. to about 170° C., preferably from about 120° C. to about 150° C., and more preferably from about 120° C. to about 140° C.

Articles comprising PHAs may be digested by washing in an automatic dishwasher with an alkaline solution, such as a solution comprising water and an automatic dishwashing composition. Most dishwashers utilize water at a temperature of less than about 100° C. Thus, in one embodiment the alkaline solution generally has a temperature of at least about 45° C., preferably at least about 50° C., more preferably at least about 60° C., and generally less than about 100° C.

Generally the polyhydroxyalkanoate-containing article is mixed with the alkaline solution in a weight ratio of solid article to alkaline solution of from about 1:1000 to about 1:5, preferably from about 1:100 to about 1:10. If desired, the polyhydroxyalkanoate article may be cracked, crushed, broken, chipped, shredded, torn or otherwise mechanically treated prior to contacting with the hot alkaline solution. Further, if desired, the hot alkaline solution may be stirred or agitated during digestion. The resulting liquid, which may be in the form of a slurry, suspension or watery liquid, is biodegradable. Thus, the resulting liquid may be disposed of in the sewer system.

The polyhydroxyalkanoate copolymers may be partially, preferably substantially, more preferably completely, digested with the hot alkaline solution. The desired level of digestion may be obtained by adjusting the time of the digestion treatment. As used herein, partially digested is intended to mean at least at portion, preferably at least about 15%, by weight, of the polyhydroxyalkanoate is digested. As used herein, substantially digested is intended to mean at least about 50%, preferably at least about 70%, more preferably at least about 85%, by weight, of the polyhydroxyalkanoate is digested. As used herein, completely digested is intended to mean about 100%, by weight, of the polyhydroxyalkanoate is digested. Digestion can be determined by passing the liquid obtained after treatment with the hot alkaline solution through a 0.2 mm meshed screen. The PHA that does not pass through the screen is considered to be undigested, while the PHA that passes through the screen is considered to be digested.

The articles to be digested may be in the forms of films, sheets, fibers, foams, or molded or thermoformed articles. As used herein, "film" means an extremely thin continuous piece of a substance having a high length to thickness ratio and a high width to thickness ratio. While there is no requirement for a precise upper limit of thickness, a preferred upper limit is about 0.254 mm, more preferably about 0.01 mm, and even more preferably about 0.005 mm. The films may be processed using conventional procedures for producing single or multilayer films on conventional film-making equipment.

As used herein, "sheet" means a very thin continuous piece of a substance, having a high length to thickness ratio and a high width to thickness ratio, wherein the material is thicker than about 0.254 mm. Sheeting shares many of the same characteristics as film in terms of properties and manufacture, with the exception that sheeting is stiffer, and has a self-supporting nature.

As used herein, "fiber" refers to a flexible, macroscopically homogeneous body having a high length-to-width ratio and a small cross section.

As used herein, "foam" refers to copolymers of the present invention whose apparent density has been substantially decreased by the presence of numerous cells distributed throughout its bulk.

As used herein, "molded" refers to articles that are formed from compositions which are injected, compressed, or blown by means of a gas into a shape defined by a mold, while "thermoformed articles" refers to articles formed by heating planks or sheets of the polyhydroxyalkanoate until flexible and then stamping or vacuum pulling the polyhydroxyalkanoate into the proper shape.

In one embodiment of the invention, articles which comprise polyhydroxyalkanoate copolymers may be at least partially digested, preferably substantially digested, and more preferably completely digested by a hot alkaline solution. Articles which may be disposed of using the methods in accordance with the invention include health care items and food service items. These articles may be used at temperatures up to at least about 80° C., preferably up to at least about 100° C., without loss of dimensional integrity. Thus, the temperature of the hot alkaline solution used to digest such articles will be greater than the highest temperature at which there is no loss of loss of dimensional integrity. In one embodiment, the articles are flexible and not brittle.

As used herein, "health care items" is intended to mean items used in providing dental, medical or veterinarian care, and include gloves, medical tubing, blood pressure cuffs, clothing elastic, face masks, sutures, anesthesia mouthpieces, toothbrushes, toothpicks, dental floss, dental bite blocks, dental cofferdams, dental retainers, mouth guards, respirator bellows, adhesive tape, bandages, sheets, pads, bed pans, waste bags, enema bags and tips, intravenous fluid bags, syringes, bedding items and mixtures thereof. As used herein, "medical tubing" in intended to include tubing used for medical procedures such as intravenous tubing, airways, catheters, shunts, drains, dialysis tubing and parenteral feeding tubing, while "bedding items" include sheets, pillowcases, towels, washcloths, and foam mattress pads.

"Food service items" is intended to mean items used in preparing and/or serving food, such as utensils, plates, cups, trays, cup holders, napkins, table clothes, towels, toothpicks, straws, and sticks for food products such as lollipops and frozen snacks, such as POPSICLE® and ice cream novelties. Food service items in intended to include infant food service items include nipples, baby bottles and bottle liners, teething rings and pacifiers.

Items such as intravenous fluid bags may be formed from films or sheets of the polyhydroxyalkanoate copolymer. Edges of the bags made be sealed with adhesives comprising the polyhydroxyalkanoate copolymer. The films may be processed using conventional procedures for producing single or multilayer films on conventional film-making equipment.

Items such as sutures and dental floss would generally be formed from fibers. As used herein, "fiber" refers to a flexible, macroscopically homogeneous body having a high length-to-width ratio and a small cross section. Bedding items may comprise woven or non-woven fabrics, and may comprise fibers made at least partially, preferably completely, from PHAs.

Health care items such as face masks, anesthesia mouth pieces, dental equipment (including toothbrushes, bite blocks, cofferdams and retainers), bulb syringes and bed pans may be molded or thermoformed articles. Some items, such as medical tubing, may be molded or extruded.

Food service items such as plates, cups, cup lids, cup holders, trays may be formed from foam comprising the PHAs, may be molded or thermoformed articles, and also may be formed from wood or paper substrates coated with PHAs. Generally, items such as plates and cups have a thickness of from about 2.5 mm to about 0.1 mm, preferably from about 2 mm to about 0.1 mm, more preferably about 0.5 mm, while utensils such as forks, knifes and spoons have a thickness of from about 5 mm to about 0.2 mm, preferably from about 4 mm to about 0.5 mm, more preferably about 1 mm.

Food service items such as nipples, baby bottles, straws, toothpicks and sticks will generally be molded articles, although some items, such as straws, may also be extruded. Items such as sticks may also be formed from wood coated with PHAs. Items such as napkins, table clothes and towels may be woven or non woven fabrics, and may comprise fibers made at least partially, preferably completely, from PHAs.

An article may comprise a PHA component and at least one additional component. For example, plastic laminates may comprise more than one layer, wherein at least one layer comprises PHAs. The plastic laminate generally comprises an adhesive, preferably the adhesive comprises PHAs. Woven or nonwoven fabric may comprise more than one fiber, wherein a least one fiber comprises PHAs. Other composite articles may comprises fibers or particles held together by a binder or adhesive comprising PHAs. Health care items such as anesthesia mouthpieces, masks, and dental retains may comprise metal components in addition to a PHA component, while sticks may comprise wood coated with a PHA.

In one embodiment the items are formed from a polyhydroxyalkanoate comprising two randomly repeating monomer units. The first randomly repeating monomer unit has the structure:

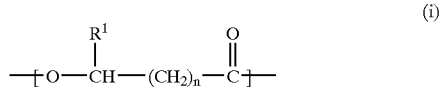

(i)

wherein $R^1$ is H or a $C_{1-2}$ alkyl, and n is 1 or 2; and the second randomly repeating monomer unit has the structure:

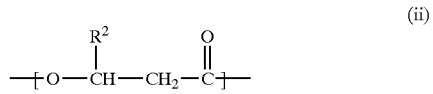

(ii)

wherein $R^2$ is a $C_{3-19}$ alkyl or a $C_{3-19}$ alkenyl, preferably a $C_{4-19}$ alkyl or a $C_{4-19}$ alkenyl.

In one embodiment the polyhydroxyalkanoate copolymer comprises a first randomly repeating monomer unit having the structure:

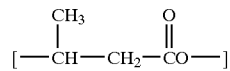

and a second randomly repeating monomer unit having the structure:

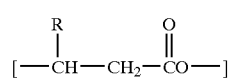

wherein R is $(CH_2)_q$—$CH_3$ and q is a least 2, preferably from about 2 to about 18, more preferably from about 4 to about 16, and even more preferably about 4. The molar ratio of the first RRMU to the second RRMU is from about 50:50 to about 99:1, preferably from about 80:20 to about 96:4, more preferably from about 88:12 to about 93:7.

In another embodiment the polyhydroxyalkanoate comprises a third randomly repeating monomer unit having the structure:

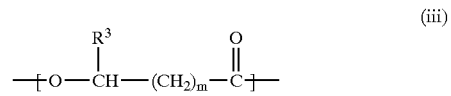

(iii)

wherein $R^3$ is H, a $C_{1-19}$ alkyl or a $C_{1-19}$ alkenyl, and m is 1 or 2, and the third RRMU is not the same as the first RRMU or the second RRMU.

Polyhydroxyalkanoate copolymers comprising three RRMUs will generally comprise, by weight, at least about 50% of the first RRMU, and generally no greater than about 20% of the third RRMU. The composition may comprise at least about 4%, more preferably at least about 5%, and even more preferably at least about 8%, and no more than about 15%, preferably no more than about 12%, more preferably no more than about 10%, by weight, of the third RRMU. The preferred level of monomers is dependent upon the desired characteristic of the article, that is, whether the article is a foam article, a molded article, a thermoformed article, an extruded article, or whether the article comprises a wood or paper substrate having a copolymer coating.

In a preferred embodiment, items are molded or thermoformed articles comprising a PHA. The molded or thermoformed articles generally have a thickness of no more than about 3 mm, preferably no more than about 2 mm, more preferably no more than about 1 mm think, even more preferably no more than about 0.7 mm. In one embodiment molded or thermoformed articles have a thickness of from about 2.5 mm to about 0. 1 mm, preferably from about 2 mm to about 0.1 mm, more preferably about 0.5 mm, while in another embodiment the articles have a thickness of from about 5 mm to about 0.2 mm, preferably from about 4 mm to about 0.5 mm, more preferably about 1 mm.

Generally the weight average molecular weight of the PHA used to form molded or thermoformed articles will be greater than about 200,000, preferably greater than about 300,000, more preferably greater than about 400,000, and even more preferably greater than about 500,000. The PHA preferably comprises a first RRMU having formula (i) above, and a second RRMU having formula (ii) above. In one embodiment the molded or thermoformed articles comprise no more than about 20%, preferably from about 5% to about 20%, more preferably about 6% to about 18%, by weight of total PHA, of the third RRMU having the formula (iii) above.

In one embodiment the weight average molecular weight of the copolymer used to form a molded or thermoformed article is greater than about 200,000, preferably greater than about 300,000. The articles may comprise from about 3% to about 14%, preferably from about 5% to about 8%, by weight of total PHA, of the third RRMU having the formula (iii) above.

In another embodiment the weight average molecular weight of the copolymer used to form a molded or thermoformed article is greater than about 300,00, preferably greater than about 500,000. The articles may comprise from about 5% to about 15%, by weight of total PHA, of the third RRMU having the formula (iii) above.

In yet another embodiment articles are formed from a PHA foam comprising a first RRMU having formula (i) above, and a second RRMU having formula (ii) above. Generally the PHA has a weight average molecular weight of greater than 300,000, preferably greater than about 400,000. In one embodiment the PHA foam comprises from about 3% to about 16%, preferably from about 4% to about 16%, even more preferably from about 5% to about 12%, by weight of total PHA, of the third RRMU having the formula (iii) above.

In one embodiment, extruded items comprise a PHA comprising a first RRMU having formula (i) above, and a second RRMU having formula (ii) above. Preferably the weight average molecular weight of the copolymer is greater than about 400,000. In one embodiment the extruded food service items comprise from about 6% to about 15%, more preferably from about 8% to about 12%, by weight of total PHA, of the third RRMU having the formula (iii) above.

In one embodiment, the items comprise a substrate having a coating comprising a PHA. Often the substrate will be a wooden substrate or a paper substrate. As used herein, "paper substrate" refers to a substrate other than wood formed from cellulose fiber, including paper and cardboard. A coating comprising PHA improves the water and grease resistance paper substrates, and provides the substrate with a smoother surface.

The PHAs used as coatings preferably comprise a first RRMU having formula (i) above, and a second RRMU having formula (ii) above. Preferably the weight average of molecular weight of the copolymer is greater than 50,000, preferably greater than about 100,000. In one embodiment the PHAs used as coatings comprise from about 4% to about 20%, preferably at least about 5%, by weight of total PHA, of the third RRMU having the formula (iii) above. The coatings may further comprise colorants in order to provide the items with a more attractive appearance. The coatings may be applied to pre-formed articles in any convenient manner, such as spraying, dipping or extrusion coating.

In one embodiment, films or sheets comprise PHA. Such films or sheet may be used to laminate substrates such as paper, and the resulting laminates may be used to form items such as coated paper plates or cups. Preferably the films or sheets comprise a PHA which comprises a first RRMU having formula (i) above, and a second RRMU having formula (ii) above. Preferably from about 50% to about 99.9%, more preferably from about 80% to about 99.5%, even more preferably from about 90% to about 99%, of the RRMUs of the PHA have the structure of the first RRMU. The weight average molecular weight of the PHA is generally greater than 100,000, preferably greater than 200,000, and more preferably greater than about 300,000. In one embodiment the films or sheets comprise no more than about 20%, preferably from about 20% to about 0.1%, more preferably from about 10% to about 0.5%, by weight of total PHA, of the total of the second RRUM having the formula (ii) above and any optional third RRMU having the formula (iii) above.

In one embodiment, fibers comprise PHA. The PHA-containing fibers may be combined with other fibers, preferably biodegradable fibers such as cotton, rayon, hemp, wool, and silk, to form fabrics, threads or yarns.

The items may comprise additives such as colorants, anti-bacterial agents, flavors and fragrances. Preferably, such additives are nonfugitive. As used herein, "nonfugitive" refers to an additive that does not escape from the polyhydroxyalkanoate copolymer at a faster rate than that at which the copolymer biodegrades. The items herein may be formed from a composition comprising the biodegradable polyhydroxyalkanoate copolymer and colorant. Alternatively, colors and designs may be printed on the items after manufacture. Preferably the colorants are non-toxic.

Many plastic items comprise plasticizers such as phthalate plasticizers or adipic acid derivatives such as di-2 ethyl hexyl adipate. Phthalate plasticizers refer to compounds comprising a phthalate group used as plasticizers. Such plasticizers include bis-2-ethylhexyl phthalate, also referred to as dioctyl phthalate (DOP) and di-2-ethylhexyl phthalate (DEHP), and diisononyl phthalate (DINP). Other phthalate plasticizers include butyl benzyl phthalate, butyl octyl phthalate, di-n-butyl phthalate, dicapryl phthalate, dicyclohexyl phthalate, diethyl phthalate, dihexyl phthalate, diisobutyl phthalate, diisodecyl phthalate, diisohectyl phthalate, diisooctyl phthalate, dimethyl phthalate, ditridecyl phthalate, diundecyl phthalate, undecyl dodecyl phthalate and mixtures thereof.

However, there is concern that plasticizers, particularly phthalate plasticizers may leach from plastic items. Thus, articles employed according to the invention, preferably health care items and food service items, may be substantially free of, more preferably free of, plasticizers, particularly phthalate plasticizers. As used herein, substantially free of means preferably no greater than 20%, more preferably no greater than 10%, even more preferably less than 5%, by weight, of the item is plasticizers. In one embodiment the item is free of plasticizers.

Articles comprising PHAs may be made by any art-recognized process, such as those disclosed in Noda, U.S. Pat. Nos. 5,618,885, 5,602,227, and 5,489,470 incorporated herein by reference. For example, foams of the present invention may be processed using conventional procedures well-known to those skilled in the art. A predominant method of foam production involves expanding a fluid polymer (or copolymer) phase to a low density cellular phase and then preserving this state. Other processes include leaching out materials that have been previously dispersed in the polymer (or copolymer), sintering small particles and dispersing cellular particles in a polymer (or copolymer). Three steps make up the expansion process. These are cell initiation, cell growth and cell stabilization. Many methods are used to create, grow, and stabilize cells.

Expandable formulations rely on increasing the pressure within the initiated cells relative to that of the surroundings. The cells are stabilized by either chemical (e.g. crosslinking, polymerization) or physical means (e.g., crystallization, glass transition). A blowing agent such as isomeric pentanes and hexanes or halocarbons is mixed with the polymer (or copolymer) either by heating and allowing the blowing agent to penetrate the polymer, or by polymerizing the polystyrene in the presence of the blowing agent. Fabrication of articles are usually carried out in multiple steps, the first of which uses steam, hot water or hot air to expand the polymer into low density preformed beads. These preformed beads are aged, sometimes in multiple steps for correct cell size, and then packed into molds and fused together by heat and further expansion. Stabilization is accomplished by cooling the polymer to temperatures below its glass transition temperature.

Decompression expansion processes create and grow cells by lowering the external pressure during processing. Cellular polyethylene and polypropylene are often made in this manner. A decomposing blowing agent is premixed with the polymer (or copolymer) and fed through an extruder under elevated temperature and pressure such that the blowing agent partially decomposes. When the material exits the extruder, it enters a lower pressure zone. Simultaneous expansion and cooling take place, resulting in a stable cellular structure owing to rapid crystallization of the polymer.

Dispersion processes produce foams by directly dispersing a solid or gas into the polymer (or copolymer) phase and then, when necessary, stabilizing the mixture. In one such process, frothing, a gas is mechanically dispersed in the polymer or monomer phase, producing a foam of temporary stability. This foam is then chemically stabilized by crosslinking or polymerization. Latex foam rubber is manufactured in this way.

Molded articles can be solid or hollow objects. Injection molding of thermoplastics is a multi-step process by which a PHA of the present invention is heated until it is molten, then forced into a closed mold where it is shaped, and finally solidified by cooling. There are a variety of machines that are used in injection molding. Three common types are ram, screw plasticator with injection, and reciprocating screw devices. A ram injection molding machine is composed of a cylinder, spreader, and plunger. The plunger forces the melt in the mold. A screw plasticator with a second stage injection consists of a plasticator, directional valve, a cylinder without a spreader, and a ram plastication by the screw. The ram forces the melt into the mold. A reciprocating screw injection machine is composed of a barrel and a screw. The screw rotates to melt and mix the material and then moves forward to force the melt into the mold.

Compression molding in thermoplastics consists of charging a quantity of a PHA of the present invention in the lower half of an open die. The top and bottom halves of the die are brought together under pressure, and then molten PHA conforms to the shape of the die. The mold is then cooled to harden the plastic.

Blow molding is used for producing bottles and other hollow objects. In this process, a tube of molten PHA known as a parison is extruded into a closed, hollow mold. The parison is then expanded by a gas, thrusting the PHA against the walls of a mold. Subsequent cooling hardens the plastic. The mold is then opened and the article removed.

Blow molding has a number of advantages over injection molding. The pressures used are much lower than injection molding. Blow molding can be typically accomplished at pressures of from about 25 to about 100 psi between the plastic and the mold surface. By comparison, injection molding pressures can reach from about 10,000 to about 20,000 psi. In cases where the PHA has a molecular weight too high for easy flow through molds, blow molding is the technique of choice. High molecular weight polymers (or copolymers) often have better properties than low molecular weight analogs, for example high molecular weight materials have greater resistance to environmental stress cracking. It is possible to make extremely thin walls in products with blow molding. This means less PHA is used, and solidification times are shorter, resulting in lower costs through material conservation and higher throughput. Another important feature of blow molding is that since it uses only a female mold, slight changes in extrusion conditions at the parison nozzle can vary wall thickness. This is an advantage with structures whose necessary wall thicknesses cannot be predicted in advance.

As used here, "thermoforming" refers to a process by which planks or sheets of the polyhydroxyalkanoate are heated until flexible and then stamped or vacuum pulled into the proper shape. Generally a sheet is fed through an oven and heated to bring it to a thermoformable temperature. The sheet is heated to a softening point and then advanced to a forming station. Alternatively, a sheet may move directly from an extruder to a forming station by means of a series of rolls, which can either be heated or cooled to bring the sheet to the proper thermoforming temperature. The forming station comprises molds or stamps of the desired shapes.

Coated articles may be formed using any conventional coating technique. Coating techniques include extrusion coating, roller coating, brush coating, dip coating, spray coating, electrostatic coating, centrifugal coating and cast coating. Articles may be coated with melted PHA, and then exposed to a coolant, such as water, by any acceptable method, such as dipping or spraying. As used herein, "coated items" includes items formed from laminates of a paper substrate and a film or sheet comprising a PHA.

Coating equipment may be used to apply a surface coating to a substrate. Suitable substrates include porous web, such as paper or cardboard. The coatings may serve as barriers, decorative coatings, or other purposes. Coating may be used to apply adhesive for laminating one web to another or for manufacturing of pressure-sensitive tapes and labels. It also may be used for saturation of a porous web, such as paper, in order to improve its resistance to moisture or grease penetration, or to improve its strength.

Coatings when applied must be sufficiently fluid to be spread into a uniformly thin layer across the web. Therefore, coatings are applied as solutions in organic solvents, as aqueous solutions or emulsions, as a hot melt (solid molten or softened by heat), or as a reactive liquid that solidifies by a polymerization reaction induced either thermally or by radiation. Extrusion coating is similar to hot-melt coating and is described in further detail below.

Coatings may be applied directly to the substrate, or may be cast to another surface, dried, and later transferred to the substrate. This transfer coating process is used for manufacturing of, for example, pressure-sensitive label stock: the adhesive is first applied to a silicone-coated release liner, dried, and then laminated to the label face stock. Coatings may be applied to the web material wound in rolls, or to precut sheets. Items such as disposable plates and trays may be formed by pressing coated paperboard blanks between forming dies, as disclosed in Shanton, U.S. Pat. No. 5,776, 619, incorporated herein by reference.

In extrusion coating, a film of molten polymer is deposited between two moving webs in a nip created by a rubber pressure roll and a chrome-plated steel chill roll. In this continuous operation, rolls of material are unwound, new rolls are automatically spliced on the fly, and the surface of the substrate may be prepared by chemical priming or other surface treatment to make it receptive to the extrusion coating, and to help develop adhesion between the two materials.

Fibers may be prepared using a variety of conventional techniques, such as melt spinning, dry spinning, and wet spinning. Combinations of these three basic processes are often used.

In melt spinning, a PHA of the present invention is heated above its melting point and the molten PHA is forced through a spinneret. A spinneret is a die with many small orifices which are varied in number, shape and diameter. The jet of molten PHA is passed through a cooling zone where the PHA solidifies and is then transferred to post-drawing and take-up equipment.

In dry spinning, a PHA of the present invention is dissolved and the PHA solution is extruded under pressure through a spinneret. The jet of PHA solution is passed through a heating zone where the solvent evaporates and the filament solidifies.

In wet spinning, a PHA of the present invention is also dissolved and the solution is forced through a spinneret which is submerged in a coagulation bath. As the PHA solution emerges from the spinneret orifices within the coagulation bath, the PHA is either precipitated or chemically regenerated. Usually, all these processes need further drawing for useful properties to be obtained, for example to serve as textile fibers. "Drawing" refers to stretching and attenuation of fibers to achieve an irreversible extension, induce molecular orientation, and develop a fiber-fine structure. This fine structure is characterized by a high degree of crystallinity and by orientation of both the crystallites and the amorphous PHA chain segments.

In the examples below, and throughout the specification, amounts and percentages are by weight unless indicated otherwise.

EXAMPLE 1

Alkaline Digestion of a Pliable Sheet with a Sodium Hydroxide Solution

A piece of highly pliable sheet with the approximate dimension of 1×5×10 mm is fabricated from poly(3-hydroxybutyrate-co-3-hydroxyhexanoate) containing about 10 mole % hydroxyhexanoate units. The pliable sheet, about 50 g of 0.1 N sodium hydroxide aqueous solution, and a magnetic stir bar are placed in a 250-mL Pyrex pressure reaction bottle. The reaction bottle is sealed with a rubber gasket and bottle cap and placed in an oil bath set at the temperature of about 130° C. with magnetic stirring. After two hours of treatment in the NaOH solution, the plastic sheet placed in the solution is fully disintegrated to form a grayish watery slurry.

EXAMPLE 2

Alkaline Digestion of a Soft Film with a Dishwashing Detergent Solution

A soft plastic film is prepared by pressing about 2.0 g of poly(3-hydroxybutyrate-co-3-hydroxyoctanoate) containing about 7.8 mole % 3-hydroxyoctanoate units to about 0.25 mm thickness at about 150° C. A mixture of about 95 g of distilled water and 5 g of dishwashing detergent (CASCADE®, Procter & Gamble Company, Cincinnati, Ohio) is placed in a 300-mL high-pressure reactor equipped with a heater and stirring mechanism (Parr Pressure Reactor, Parr Instrument Company, Moline, Ill.). The soft plastic film is cut into a strip of 10×15 mm and placed in the reactor. The loaded and sealed reactor is heated from room temperature to about 150° C. while being stirred at about 400 rpm over 20 minutes. Once the reactor temperature reaches 150° C., the stirring rate is increased to 1,750 rpm for 30 minutes. The reactor is then cooled in an ice bath, while being stirred at 300 rpm. The digested slurry of the film in dishwashing detergent solution is then strained through a 0.2 mm mesh screen to remove any residual undigested particles of disintegrated film. Over 85%, by weight, of the polymer film is digested by this process.

EXAMPLE 3

Alkaline Digestion of a Flexible PHBO Cup

A flexible plastic cup with the diameter of 25 mm and height of 15 mm is prepared by compression molding about 2.0 g of poly(3-hydroxybutyrate-co-3-hydroxyoctanoate) (PHBO) containing about 5.8 mole % 3-hydroxyoctanoate units at about 160° C. This cup is flexible and tough such that it does not break even if it is squeezed substantially by fingers. A mixture of about 95 g of distilled water and 5 g of dishwashing detergent (CASCADE®, Procter & Gamble Company, Cincinnati, Ohio) and the plastic cup are placed in a 300-mL high-pressure reactor equipped with a heater and stirring mechanism (Parr Pressure Reactor, Parr Instrument Company, Moline, Ill.). The loaded and sealed reactor is heated from room temperature to about 150° C. while being stirred at about 400 rpm over 20 minutes. Once the reactor temperature reaches about 150° C., the stirring rate is increased to 1,750 rpm for 30 minutes. The reactor is then cooled in an ice bath, while being stirred at 300 rpm. The flexible plastic cup is fully digested to a watery slurry.

EXAMPLE 4

Fabrication of a Brittle PHBV Cup

A brittle plastic cup with the diameter of 25 mm and height of 15 mm is prepared by the method similar to Example 3 using poly(3-hydroxybutyrate-co-3-hydroxyoctanoate) (PHBV) containing about 5.5 mole % 3-hydroxyvalerate units. The plastic resin is compression molded at 180° C. and then cooled to room temperature by removing the product from the mold. This cup is stiff and fragile such that it breaks if it is squeezed even moderately by fingers.

EXAMPLE 5

Fabrication of PLA Cups

Several plastic cups with the diameter of 25 mm and height of 15 mm are prepared by the method similar to Example 3 using poly(lactic acid) (PLA) (Cargill, Minneapolis, Minn.). The plastic resin is compression molded at about 140° C. and then quenched to room temperature in the mold. Thermal stability is tested by placing one plastic cup in hot water of about 80° C. The material comprising the cup becomes extremely soft and fluid, and this plastic article is collapsed to a useless molten mass. Another cup is annealed in an oven at 90° C. overnight to develop crystallinity. The cup after annealing becomes stiff and fragile such that it breaks if it is squeezed even moderately by fingers.

EXAMPLE 6

Alkaline Treatment of a Polycaprolactone Film

A soft film is prepared by pressing about 2.0 g of polycaprolactone to 0.25 mm thickness at about 150° C. A mixture of about 95 g of distilled water and 5 g of dishwashing detergent (CASCADE®, Procter & Gamble Company, Cincinnati, Ohio) is placed in a 300-mL high-pressure reactor equipped with a heater and stirring mechanism (Parr Pressure Reactor, Parr Instrument Company, Moline, Ill.). The film is cut into a strip of 10×15 mm and placed in the reactor. The loaded and sealed reactor is heated from room temperature to about 150° C. while being stirred at about 400 rpm over 20 minutes. Once the reactor temperature reaches about 150° C., the stirring rate is increased to 1,750 rpm for 30 minutes. The reactor is then cooled in an ice bath, while being stirred at 300 rpm. The film fragments suspended in the dishwashing detergent solution are then collapsed by straining through a 0.2 mm meshed screen. Most of the plastic material comprising the original film is collected. Less than 1%, by weight, of the polycaprolactone film is digested.

EXAMPLE 7

Alkaline Treatment of a Butylene Diol/succinic Acid Copolymer Film

A soft film is prepared by pressing about 2.0 g of copolymer of butylene diol and succinic acid (BIONOLLE™, Showa High Polymers, Japan) to 0.25 mm thickness at about 160EC. A mixture of about 95 g of distilled water and 5 g of dishwashing detergent (CASCADE®, Procter & Gamble Company, Cincinnati, Ohio) is placed in a 300-mL high-pressure reactor equipped with a heater and stirring mechanism (Parr Pressure Reactor, Parr Instrument Company, Moline, Ill.). The film is cut into a strip of 10×15 mm and placed in the reactor. The loaded and sealed reactor is heated from room temperature to about 15° C. while being stirred at about 400 rpm over 20 minutes. Once the reactor temperature reaches about 150° C., the stirring rate is increased to 1,750 rpm for 30 minutes. The reactor is then cooled in an ice bath, while being stirred at 300 rpm. The film fragments suspended in the dishwashing detergent solution are then collected by straining through a 0.2 mm meshed screen. A large part of the plastic material comprising the original film is collected. Less than 25%, by weight, of butylene diol/succinic acid film is digested.

Additional embodiments and modifications within the scope of the claimed invention will be apparent to one of ordinary skill in the art. Accordingly, the scope of the present invention shall be considered in the terms of the following claims, and is understood not to be limited to the details or the methods described in the specification.

What is claimed is:

1. A method of disposing of biodegradable material, the method comprising the step of exposing the biodegradable material to a hot alkaline solution, said solution having a temperature of at least about 100° C., wherein the biodegradable material comprises polyhydroxyalkanoate copolymer comprising a first randomly repeating monomer unit having the structure:

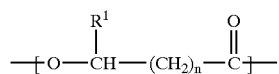
(i)

wherein $R^1$ is H or a $C_{1-2}$ alkyl, and n is 1 or 2; and a second randomly repeating monomer unit having the structure:

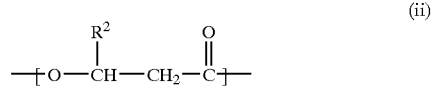
(ii)

wherein $R^2$ is a $C_{3-19}$ alkyl or a $C_{3-19}$ alkenyl; and wherein at least 50% of the randomly repeating monomer units have the structure of the first randomly repeating monomer unit.

2. A method according to claim 1, wherein the hot alkaline solution has a temperature of at least about 120° C.

3. A method according to claim 2, wherein the hot alkaline solution has a pH of at least about 8.5.

4. A method according to claim 1, wherein the first randomly repeating monomer unit has the structure:

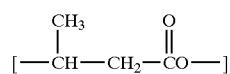

and the second randomly repeating monomer unit has the structure:

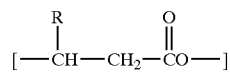

wherein R is $(CH_2)_q$—$CH_3$ and q is at least 2.

5. A method according to claim 4, wherein q is from about 2 to about 18.

6. A method according to claim 5, wherein the molar ratio of the first randomly repeating monomer unit to the second randomly repeating monomer unit is from about 50:50 to about 99:1.

7. A method according to claim 5, wherein q is from about 4 to about 16 and the molar ratio of the first randomly repeating monomer unit to the second randomly repeating monomer unit is from about 80:20 to about 96:4.

8. A method according to claim 4, wherein the polyhydroxyalkanoate copolymer is flexible.

9. A method according to claim 1, wherein the polyhydroxyalkanoate copolymer further comprises a third randomly repeating monomer unit having the structure:

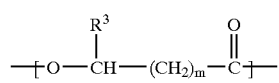
(iii)

wherein $R^3$ is H, a $C_{1-19}$ alkyl or a $C_{1-19}$ alkenyl, and m is 1 or 2; and wherein the third randomly repeating monomer unit is not the same as the first randomly repeating monomer unit or the second randomly repeating monomer unit.

10. A method of converting at least a portion of a solid article to a biodegradable liquid, comprising the steps of:

(a) providing a solid article comprising polyhydroxyalkanoate copolymer comprising a first randomly repeating monomer unit having the structure:

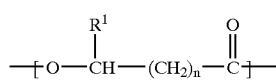

wherein R¹ is H or a $C_{1-2}$ alkyl, and n is 1 or 2; and a second randomly repeating monomer unit having the structure:

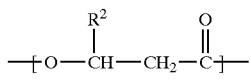

wherein R² is a $C_{3-19}$ alkyl or a $C_{3-19}$ alkenyl; and wherein at least 50% of the randomly repeating monomer units have the structure of the first randomly repeating monomer unit; and (b) contacting the solid article with a hot alkaline solution, said solution having a temperature of at least about 100° C.

11. A method according to claim 10, wherein the hot alkaline solution has a temperature of at least about 120° C.

12. A method according to claim 11, wherein the hot alkaline solution has a temperature in the range of from about 120° C. to about 170° C.

13. A method according to claim 11, wherein the hot alkaline solution has a pH of at least about 8.5.

14. A method according to claim 10, wherein the polyhydroxyalkanoate copolymer has a volume percent crystallinity no greater than about 50%.

15. A method according to claim 10, wherein the polyhydroxyalkanoate copolymer has a molecular weight of greater than about 25,000.

16. A method according to claim 10, wherein the polyhydroxyalkanoate copolymer further comprises a third randomly repeating monomer unit having the structure:

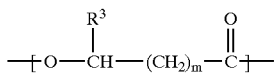

wherein R³ is H, a $C_{1-19}$ alkyl or a $C_1$ alkenyl, and m is 1 or 2; and wherein the third randomly repeating monomer unit is not the same as the first randomly repeating monomer unit or the second randomly repeating monomer unit.

17. An article comprising a polyhydroxyalkanoate copolymer, wherein the polyhydroxyalkanoate copolymer comprises a first randomly repeating monomer unit having the structure:

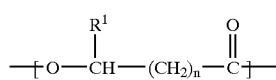

wherein R¹ is H or a $C_{1-2}$ alkyl, and n is 1 or 2; and a second randomly repeating monomer unit having the structure:

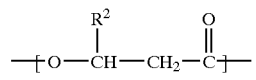

wherein R² is a $C_{3-19}$ alkyl or a $C_{3-19}$ alkenyl;

wherein at least 50% of the randomly repeating monomer units have the structure of the first randomly repeating monomer unit, and wherein the article is capable of being at least partially digested by exposure to a hot alkaline solution, said solution having a temperature of at least about 100° C.

18. An article according to claim 17, wherein the first randomly repeating monomer unit has the structure:

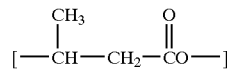

and the second randomly repeating monomer unit has the structure:

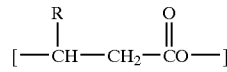

wherein R is $(CH_2)_q$—$CH_3$ and q is from about 2 to about 18.

19. An article according to claim 17, wherein the article is a health care item selected from the group consisting of gowns, gloves, medical tubing, blood pressure cuffs, face masks, sutures, anesthesia mouthpieces, dental bite blocks, dental cofferdams, dental retainers, respirator bellows, adhesive tape, bandages, sheets, pads, bed pans, waste bags, enema bags and tips, intravenous fluid bags, syringes, bedding items and mixtures thereof.

20. An article according to claim 19, wherein the article is medical tubing selected from the group consisting of intravenous tubing, airways, catheters, shunts, drains, dialysis tubing, parenteral feeding tubing and mixtures thereof.

21. An article according to claim 17, wherein the article is a food service item selected from the coup consisting of utensils, plates, cups, trays, cup holders, toothpicks, straws, sticks and mixtures thereof.

22. An article according to claim 17, wherein the article is at least partially digested by exposure to a hot alkaline solution having a temperature of at least about 120° C. and a pH of greater than about 7.

23. An article according to claim 22, wherein the article is at least partially digested by exposure to hot alkaline solution having a temperature in the range of from about 120° C. to about 170° C. and a pH of at least about 8.5.

24. An article according to claim 17, wherein the polyhydroxyalkanoate copolymer has a volume percent crystallinity no greater than about 50%.

25. An article according to claim 24, wherein the polyhydroxyalkanoate copolymer has a volume percent crystallinity of from about 20% to about 40%.

26. An article according to claim 17, wherein the polyhydroxyalkanoate copolymer has a volume percent crystallinity greater than about 50%.

27. A method of decontaminating and at least partially digesting a health care item, the method comprising the step of:

(a) providing a health care item; and (b) contacting the health care item with a hot alkaline solution, said solution having a temperature of at least about 100° C.;

wherein the health care item is formed of a material comprising polyhydroxyalkanoate copolymer comprising a the first randomly repeating monomer unit having the structure:

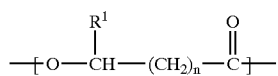 (i)

wherein $R^1$ is H or a $C_{1-2}$ alkyl, and n is 1 or 2; and a second randomly repeating monomer unit having the structure:

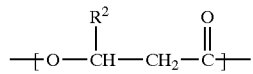 (ii)

wherein $R^2$ is a $C_{3-19}$ alkyl or a $C_{3-19}$ alkenyl; and wherein at least 50% of the randomly repeating monomer units have the structure of the first randomly repeating monomer unit.

28. A method according to claim 27, wherein the hot alkaline solution has a temperature in the range of from about 120° C. to about 170° C.

29. A method according to claim 28, wherein the hot alkaline solution has a pH of greater than about 7.

30. A method according to claim 27, wherein the hot alkaline solution has a temperature of greater than about 140° C.

31. A method according to claim 30, wherein the hot alkaline solution has a pH of at least about 8.5.

32. A method according to claim 27, wherein the first randomly repeating monomer unit has the structure:

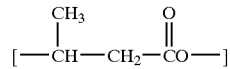

and the second randomly repeating monomer unit has the structure:

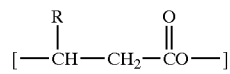

wherein R is $(CH_2)_q$—$CH_3$ and q is at least 2.

* * * * *